United States Patent
Ebrahimi et al.

(10) Patent No.: US 7,257,546 B2
(45) Date of Patent: Aug. 14, 2007

(54) SYSTEM AND METHOD FOR CORRELATING USER DATA FROM A CONTENT PROVIDER AND USER DATA FROM AN ADVERTISING PROVIDER THAT IS STORED ON AUTONOMOUS SYSTEMS

(75) Inventors: Armin Ebrahimi, Los Gatos, CA (US); Jeffrey W. Weitzman, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 972 days.

(21) Appl. No.: 09/946,772

(22) Filed: Sep. 4, 2001

(65) Prior Publication Data

US 2003/0046159 A1    Mar. 6, 2003

(51) Int. Cl.
*G06Q 30/00* (2006.01)
(52) U.S. Cl. ............... 705/14; 705/26; 705/27; 725/13; 709/217; 709/205; 709/229; 709/219; 707/501
(58) Field of Classification Search .......... 705/14, 705/26, 27
See application file for complete search history.

(56) References Cited

U.S. PATENT DOCUMENTS

| | | | | |
|---|---|---|---|---|
| 5,305,195 A | * | 4/1994 | Murphy | 705/1 |
| 5,347,632 A | * | 9/1994 | Filepp et al. | 709/202 |
| 5,740,252 A | * | 4/1998 | Minor et al. | 713/153 |
| 5,754,938 A | * | 5/1998 | Herz et al. | 725/116 |
| 5,794,210 A | * | 8/1998 | Goldhaber et al. | 705/14 |
| 5,933,811 A | * | 8/1999 | Angles et al. | 705/14 |

(Continued)

FOREIGN PATENT DOCUMENTS

WO    WO 97/41673    *    6/1997

(Continued)

OTHER PUBLICATIONS

Schwartz, R.L., "Making a cookie jar", Dec. 1998.*

(Continued)

*Primary Examiner*—Jean D. Janvier
(74) *Attorney, Agent, or Firm*—Brinks Hofer Gilson & Lione

(57) ABSTRACT

An autonomous correlation system correlates user data from a content provider and advertising view data from an advertising provider, wherein the user data is present on one autonomous system and the advertising view data is present on another autonomous system distinct from the one autonomous system, the systems being autonomous in that each is normally secured against unconstrained access by another. The autonomous correlation system comprises logic to accept a first message from a user, wherein the first message contains an indication of an object being presented to the user, the object being at least one of a content page and an advertisement, a first user identifier associated with the user by a presenter of the object; a reference database for storing an association between the first user identifier and the user; logic to accept a second message from the user, wherein the second message contains an indication of an object being presented to the user, the object being at least one of a content page and an advertisement, a second user identifier associated with the user by a presenter of the object; wherein the reference database stores an association between the second user identifier and the user.

2 Claims, 6 Drawing Sheets

U.S. PATENT DOCUMENTS 5,948,061 A * 9/1999 Merriman et al. .......... 709/219
6,006,197 A * 12/1999 d'Eon et al. ................... 705/10
6,009,409 A * 12/1999 Adler et al. ................... 705/14
6,014,638 A * 1/2000 Burge et al. .................. 705/27
6,487,538 B1 * 11/2002 Gupta et al. .................. 705/14

OTHER PUBLICATIONS

Ronald R, Yager, "Intelligent Agents For World Wide Web Advertising Decisions", 1997, International Journal Of Intelligent Systems, vol. 12, 379-390.*

* cited by examiner

| ACSID | VENDOR | VENDOR - UID | TEMP - ID |
|-------|--------|--------------|-----------|
| . . . | . . .  | . . .        | . . .     |
| 135AX | CP     | 45678        | 43301287  |
| 135AX | AP     | RA 238       | 43301287  |
| 135AY | CP     | 53107        | 29138562  |
| 135AY | DRMXP  | 301-786      | 29138562  |
| . . . | . . .  | . . .        | . . .     |

SYSTEM AND METHOD FOR CORRELATING USER DATA FROM A CONTENT PROVIDER AND USER DATA FROM AN ADVERTISING PROVIDER THAT IS STORED ON AUTONOMOUS SYSTEMS

FIELD OF THE INVENTION

The present invention relates to network data collection and tracking systems in general and more particularly to systems used for determining demographics of users viewing content and advertising on a network such as the Internet.

BACKGROUND OF THE INVENTION

The present invention is described with reference to the Internet, a global internetwork of networks in common usage today for a variety of applications, but it should be understood that references to the Internet can be substituted with references to variations of the basic concept of the Internet (e.g., intranets, virtual private networks, enclosed TCP/IP networks, etc.) as well as other forms of networks.

Generally, network nodes that connect to other network nodes support a variety of protocols as various network levels. At the application level, many Internet nodes support HyperText Transport Protocol (HTTP) for sending and receiving hypertext pages, which might include HyperText Markup Language (HTML) pages and other data supported by devices and software that handle HTTP messages. HTTP is a client-server protocol, in that a node that acts as an HTTP client makes requests of a node that acts as an HTTP server. When an HTTP client makes a request, the request includes a Universal Resource Locator (URL) that refers to the page or data requested. The URL comprises a globally unique domain name and possibly other fields that are specific to that domain name. Thus, any HTTP client can make a request by sending the request into the network. The network will resolve the domain name and route the request to an HTTP server at the specified domain and that HTTP server will resolve the remaining fields of the URL to determine what was requested.

When HTTP first came into common use, HTTP was a sessionless protocol in that a client making an HTTP request established a communication session with the HTTP server at a lower network layer, made the request, received the file and then the communication session was terminated and the client and the server did not track activity. Thus, if a server received a sequence of page requests from the same client, the server would not notice that they were from the same client, as the server had no way of tracking a "session" comprising multiple requests and responses.

In later versions of HTTP, the concept of "cookies" was added. Cookies are data elements that a server provides to a client with the expectation that the client will return the cookie in subsequent transactions, thus allowing the server to "remember" the client from request to request and thereby establish sessions and client "state" at the application layer. An example of a cookie-enabled HTTP system is shown in FIG. 1. There, a user system 10 is shown comprising a browser coupled to a network and a display coupled to the browser. The browser is shown comprising a page generator, an HTTP client and a cookie table. In operation, the HTTP client requests pages over the network, providing relevant cookies with the requests and stores received cookies. The page generator generates the requested page, sending requests for additional pages to the HTTP client as indicated by the page being generated for display. As is well-known in the art, an HTTP client might retrieve an HTML page that references other pages and in generating a display of that page, the HTTP client might make additional requests for additional pages referenced by the initial requested page.

In a typical session, a client sends a request to the server and the server returns a response to the request, along with a cookie that the server generates. The cookie is unique to that client, and possibly that session with that client. The client uses the response and stores the cookie along with an indication of the server that sent the cookie. Then, whenever the client makes a request to that server, the client includes with the request the cookie that the server provided. Since the server has associated that cookie with a particular client, the server can tailor its responses based on the client's state.

The ability to maintain client state at an HTTP server allowed content providers to provide content specific to the user of a particular client. For example, one widely used content provider is the Yahoo! network (based at www.yahoo.com). A computer user (or computing device or client device user) can access the content of the Yahoo! network by coupling a client to the Internet (or other equivalent network) and directing HTTP page requests to the Yahoo! servers. The user can operate in a stateless manner, wherein each page is served without reference to, and possibly without knowledge of, prior activity of that user. However, a more customized experience can be provided where the Yahoo! system maintains a state for the user. An example of this is the My Yahoo! property found at "my.yahoo.com".

The Yahoo! system, as well as other stateful content systems, maintains a state for each registered user. The state might include personal data (e.g., name, e-mail address, street address, telephone number, etc.), demographic data (e.g., age, gender, preferences, interests, etc.) and network behavior (pages visited, interests as determined by common page views). If a user is identifiable, the system can provide a customized experience by, for example, showing only content known to be of interest to that user and advertising that would likely be of interest to that user.

FIG. 2 illustrates an arrangement of systems for browsing content with advertisements included. As shown there, a content provider system 12 is coupled to user system 10 and an advertising provider system 14 is coupled to user system 10. Typically, such coupling is via the Internet. Content provider system 12 is shown comprising a content server 20 coupled to the network, content storage 22 coupled to content server 20 and user profile storage 24 coupled to content server 20. Advertising provider system 14 is shown comprising an ad server 30, an ad reference server 32, ad views data storage 34, campaign data storage 36 and campaign generator 38.

In a typical operation, a user uses user system 10 to request a page of content. The request is a URL directed at content server 20. In response, content server 20 provides the requested page, which may include a reference to an advertisement maintained elsewhere (e.g., at advertisement server system 14). Typically, the user logs into content server 20 so as to identify the user with the content server. If the content server can identify the user, typically associating the user with a content provider assigned ID, the content server can access user profile storage 24 to provide customized content for that user and establish behaviors of that user (e.g., what pages visited and other observed preferences). The user profile might also contain user-volunteered demographic information.

In response to the advertisement reference, user system 10 will request an advertisement, such as a banner ad, from ad server 30. The particular advertisement requested is often determined by campaign generator 38, which provides campaign data to ad reference server 32, which in turn provides the reference to content server 20 so that content server 20 can provide it to user system 10. Ad server 30 serves up the ad that is requested and logs the page view in ad views data 34. At the end of a campaign, the results of the campaign, such as how many page views occurred and how many unique page views occurred, can be obtained by reviewing the ad views data 34.

Data is probably the most significant component of third party advertisement serving. With the right data and reports, decisions can be made to better run advertising campaigns and measure proper performance of campaigns. With the right reporting technology, this data can also help bridge the gap between online and offline reporting and ultimately media-buy. At present, agencies and advertisers must guess on the usefulness of a particular data source before they run their campaign on a disparate network, since there is typically no opportunity to shop for better or more comprehensive data after the campaign universe has been created.

BRIEF SUMMARY OF THE INVENTION

In one embodiment, an autonomous correlation system correlates user data from a content provider and advertising view data from an advertising provider, wherein the user data is present on one autonomous system and the advertising view data is present in another autonomous system distinct from the one autonomous system, the systems being autonomous in that each is normally secured against unconstrained access by another. The autonomous correlation system comprises logic to accept a first message from a user, wherein the first message contains an indication of an object being presented to the user, the object being at least one of a content page and an advertisement, a first user identifier associated with the user by a presenter of the object; a reference database for storing an association between the first user identifier and the user; logic to accept a second message from the user, wherein the second message contains an indication of an object being presented to the user, the object being at least one of a content page and an advertisement, a second user identifier associated with the user by a presenter of the object; wherein the reference database stores an association between the second user identifier and the user.

The autonomous correlation system allows for reporting of user behavior over a network-wide advertising campaign, or similar effort where reporting is needed or useful to determine the efficacy of the effort but personal data is not required. In such cases, it is preferable to prevent the combination of personal data with campaign data where such combination is not needed to meet a business goal. By preventing the easy aggregation of such data, user privacy can be protected and entities that maintain data can maintain control over that data.

For example, if an advertising campaign included advertisements included with Yahoo! content and also included advertisements on content provided throughout other content networks where the advertisements are monitored by an autonomous advertisement monitoring service, a report might be needed to cover all of those campaign events. However, if one provider just passed its data to the other provider for aggregation, the other provider might make unauthorized use of the aggregated data.

One benefit of a system described herein is that many more pre-campaign and post-campaign data-gathering options are available to agencies and advertisers. Another benefit is that the system creates a viable, competitive marketplace for data collected by publishers and an open system that maintains, and in some ways enhances, user privacy and control over personal information. Providing a link between disparate vendor databases creates a competitive market for data and that data can be obtained and applied to a particular campaign at any time before, during, or after the campaign runs. The presence of a market will create choices and greater value for agencies and advertisers.

Other features and advantages of the invention will be apparent in view of the following detailed description and preferred embodiments.

DETAILED DESCRIPTION OF THE INVENTION

Embodiments of the invention will now be described, by way of example, not limitation. It is to be understood that the invention is of broad utility and may be used in many different contexts.

Figure 1:
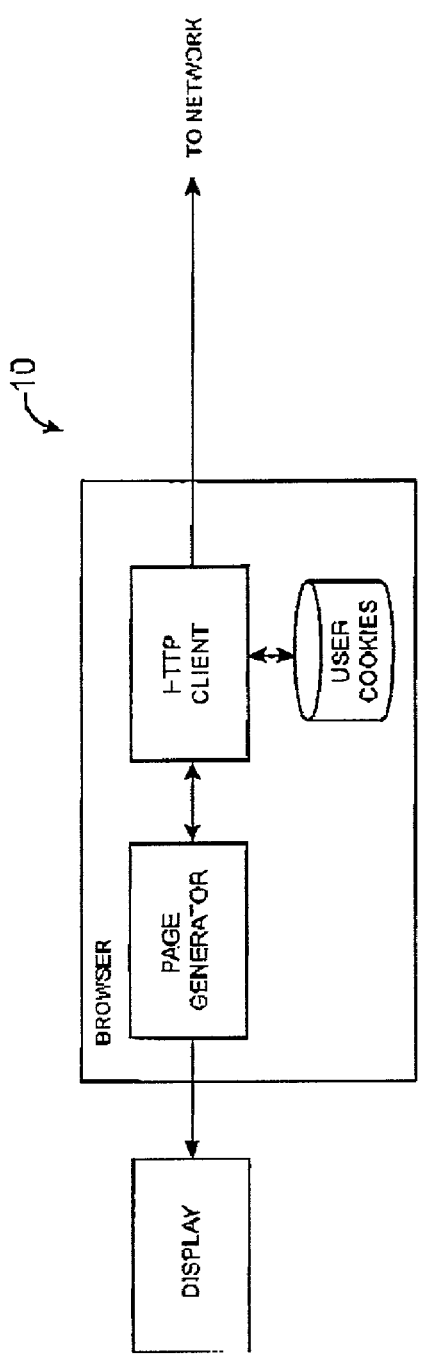
FIG. 1 is a block diagram of a typical user system used to interact with web services.
Figure 2:
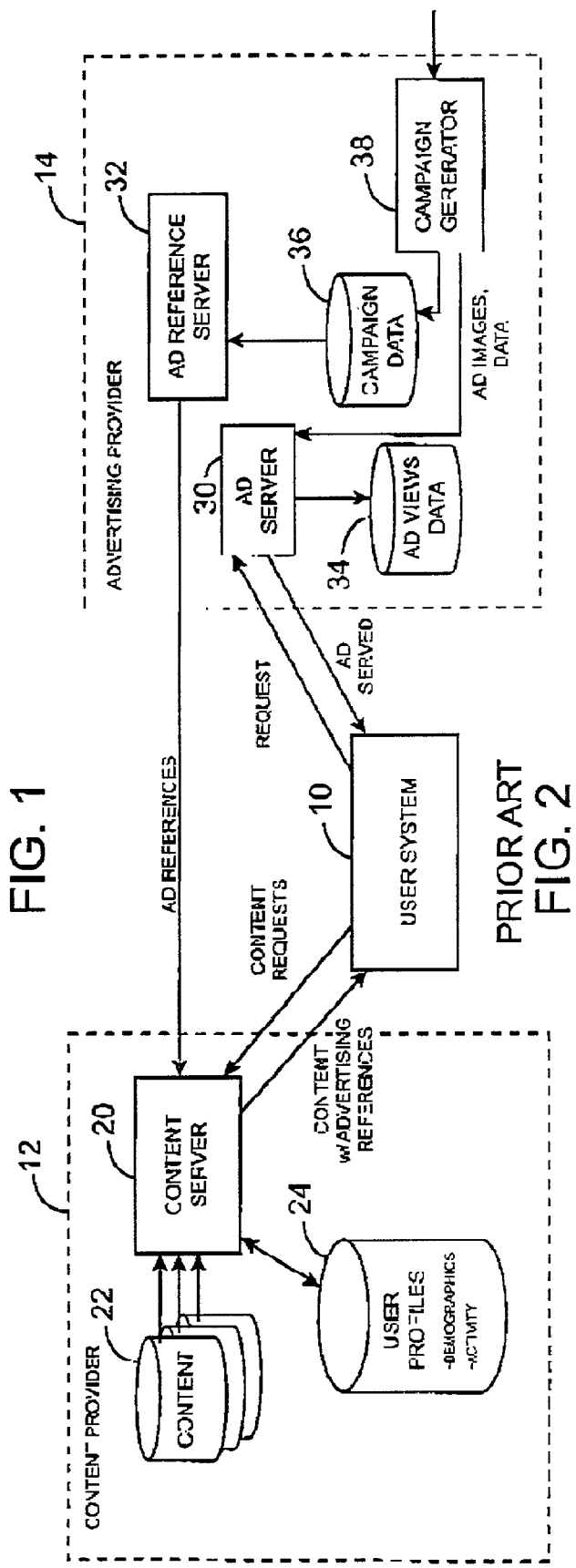
FIG. 2 is a block diagram of a typical system for providing content and advertising independent of content.
Figure 3:
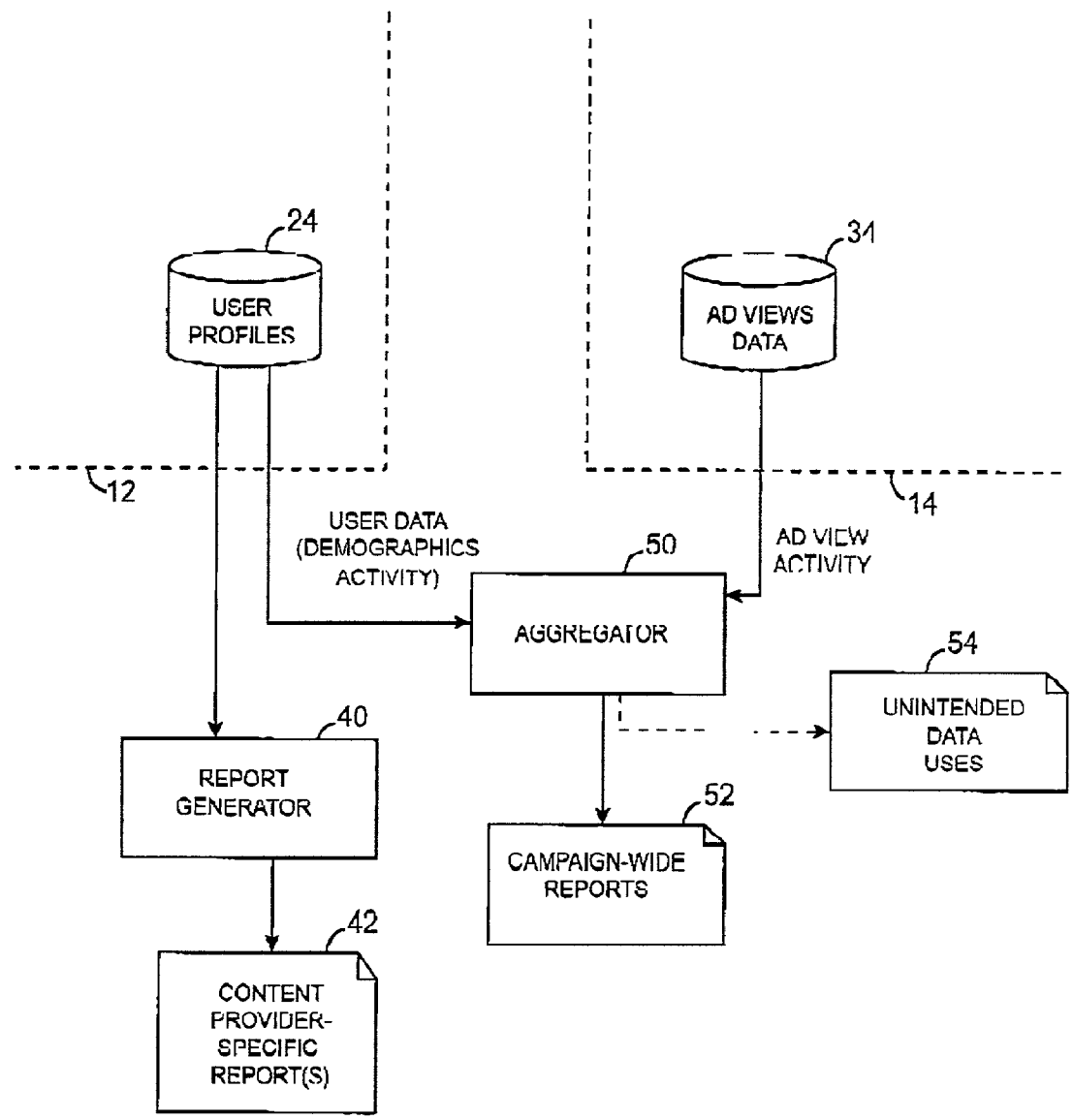
FIG. 3 is a block diagram of a known arrangement for generating campaign-wide advertising reports.
Figure 4:
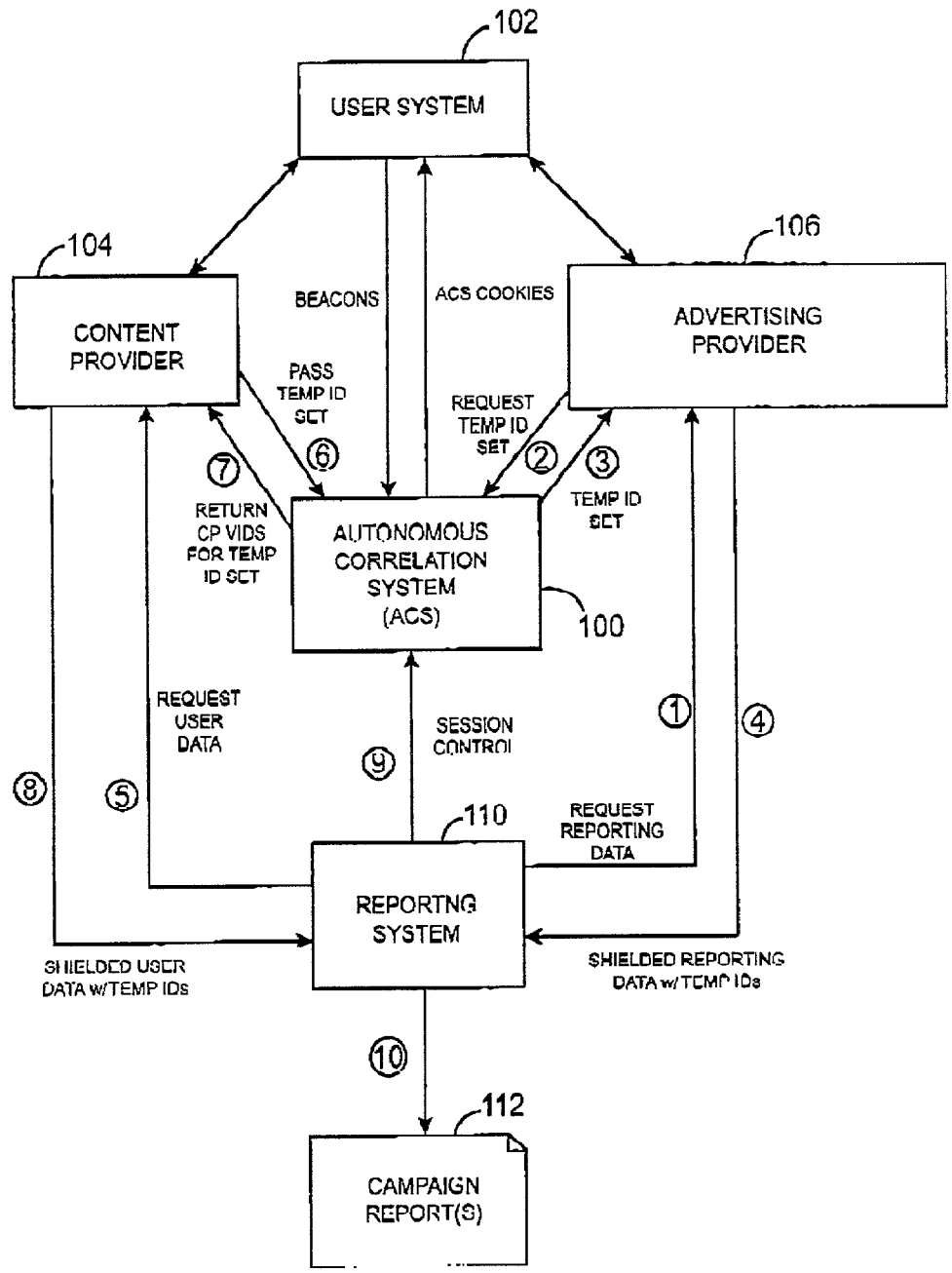
FIG. 4 is a block diagram of a system usable to aggregate ad campaign activity while preserving user privacy and data control.

FIG. 4 illustrates a basic arrangement where an autonomous correlation system (ACS) is used. As shown, an ACS 100 interacts with a user system 102, a content provider (CP) system 104, and advertising provider (AP) system 106 and a reporting system 110, which generates campaign reports 112. ACS is autonomous in that it can be controlled and secured by an entity other than the entities that control and secure other systems, such as CP 104 and AP 106. In most cases, CP 104 and AP 106 are autonomous relative to each other. Keeping these systems autonomous, in particular ACS 100, ensures that the opportunity to correlate data between systems 104 and 106 beyond the intent of the system is prohibited and difficult. This ensures anonymity of personally identifiable user information and protects data in each of systems 104 and 106 from being exposed to the other.

User system 102 receives content from CP 104 and some of that content might include beacon calls directed at ACS 100 and ACS 100 returns an ACS cookie to user system 102 in response to the beacon call. This process is described in greater detail below in connection with FIG. 5, and it should be understood that other methods of initiating messaging between user system 102 and the ACS could be used instead of beacons. It should also be understood that throughout the figures and description only one instance of an object might be shown, but a plurality of instances might exist and be in use. For example, although only one user system is shown in FIG. 4, it is contemplated that many user systems would be present.

As explained below, CP 104 associates a user identifier with user system 102 and AP 106 also associates a user identifier (almost always a different, unrelated, and often differently formatted, user identifier) with user system 102. User system 102 interacts with ASC 100 in such a way that ACS 100 can associate the disparate user identifiers even while CP 104 and AP 106 cannot make such an association. Nonetheless, reporting system 110 can compile reports over disparate user identifiers. To the benefit of the privacy of user system 102, those reports can be compiled without CP 104, AP 106 or reporting system 110 obtaining any more personal identification information than it already had. User identifiers from CP 104 and AP 106 passed to ACS 100 via the beacon call are preferably passed in an encoded form that can only be easily decoded by the CP 104 and AP 106 systems respectively (i.e., no clear text identifiers should ever be passed).

Such a process will now be described with reference to the circled number labels on data flows indicated in FIG. 4. As illustrated there, a reporting process begins with a request from reporting system 110 for reporting data from AP 106 (step 1). In this example, the data requested is assumed to be campaign data, but other data might be requested instead or as well. Campaign data might include the number of ad views, date/time of views, click-throughs, user behavior and other data about a particular ad campaign.

When AP 106 receives a request for campaign data, it determines which records are included as part of the campaign and which AP user identifiers are included. For example, if reporting system 110 is generating a report for a six-week ad campaign for Company X's new product Y, reporting system 110 would query AP 106 and provide the date ranges, a product identifier, etc. Alternatively, reporting system 110 might just provide references to such data or indications of such data. However provided, AP 106 is able to correlate that request with particular campaign activity, such as the fact that users with AP user identifiers AP1, AP2 and AP5 were presented with a banner ad for the product Y during the campaign period. Thus, AP 106 is able to compile the data responsive to the request and also identify a list of AP user identifiers of users associated with the responsive data.

AP 106 provides that list of AP user identifiers (or references or indications of such identifiers) to ACS 100 (step 2). ACS 100 then creates a set of temporary identifiers (illustrated in FIG. 6). The ACS can create temporary identifiers for all of its records, but the ACS need only generate temporary identifiers for the users associated with the AP user identifiers on AP 106's list. ACS 100 stores the set of temporary identifiers and then provides the list of temporary identifiers to AP 106. This can be in the form of a two-column table associating each AP user identifier with one temporary identifier, but other approaches can also be used. For example, AP 106 might send an ordered list to ACS 100 and ACS 100 might send back an ordered list of temporary identifiers with the understanding that they are in order and have a one-to-one correspondence with the provided AP user identifiers.

Once AP 106 obtains the temporary IDs, it uses the temporary identifiers in place of the AP user identifiers and provides the campaign data to reporting system 110 (step 4). Since the reporting system 110 receives the data with temporary IDs instead of AP user identifiers, reporting system 110 cannot later determine the users associated with the data, without the collusion of either AP 106 or ACS 100.

When reporting system 110 receives the data, it passes the temporary IDs received from AP 106 to CP 104 and requests the user data associated with those temporary IDs (step 5). CP 104 then passes the list to ACS 100 (step 6). ACS 100 then queries its correlation map to identify the records in the map associated with the temporary IDs provided by CP 104. Once the records are identified, ACS 100 returns CP 104 a list of the CP IDs that go with those temporary IDs (step 7). As with AP 106 in step 3, the returned data can be a two-column table, an ordered set of CP IDs or any other data mechanism that would allow CP to associate specific CP IDs with specific temporary IDs.

Once CP 104 obtains the relationships between CP IDs and temporary IDs, CP 104 generates a table of data responsive to the reporting system's request for data, but with the CP user identifiers replaced with their corresponding temporary identifiers. That table is then sent to the reporting system 110 in response to its request (step 8). Of course, data structures other than a table might be used, or the data can be generated and streamed out as it is generated. Thus, the invention should not be construed as being limited to one method of data processing. In addition to omitting the CP user identifiers, CP 104 might also omit other personal identifiers so that the reporting system does not have the capability of identifying the individual users associated with the user data.

Once the reporting system has the CP data and the AP data, those data sets are merged using the temporary IDs, thus allowing for the aggregation of the data. After that merging, the reporting system can use the temporary IDs or its own identifiers. In some cases, the reporting system will query another AP or CP and might use the same set of temporary IDs. However, once the reporting system has all of the data to aggregate, it sends a request (step 9) to ACS 100 requesting deletion of the temporary IDs. The reporting system can then issue a campaign report (step 10) that aggregates campaign data over one or many networks and user data from one or more maintainers of user demographic and/or behavior data, while limiting the ability for any one player to identify users any more than that player already can from the data it holds.

Since the ACS deletes the temporary IDs at the end of each reporting "session", ACS 100, CP 104 and AP 106 cannot later all collude to associate the data. Each session, a new set of temporary IDs is generated, so that disparate requestors cannot make multiple requests and find correlations in the data using the temporary IDs. Additionally, each temporary ID can be marked with a timestamp that identifies the duration that the temporary ID is valid. If the timestamp expires, the temporary IDs are deleted. This further ensures that a lost indicator message from the Reporting System 110 does not leave temporary IDs lingering at the ACS 100 system.

As described above, a session begins when an AP requests a set of temporary IDs for its set of AP user identifiers and the session ends when the reporting system requests that the ACS delete the temporary IDs. Other variations of a session might also be possible. For example, a reporting engine might first make a request of the content provider for a subset of its data relating to a particular demographic, in which case the content provider would be the initiator of the session with the ACS.

Figure 5:
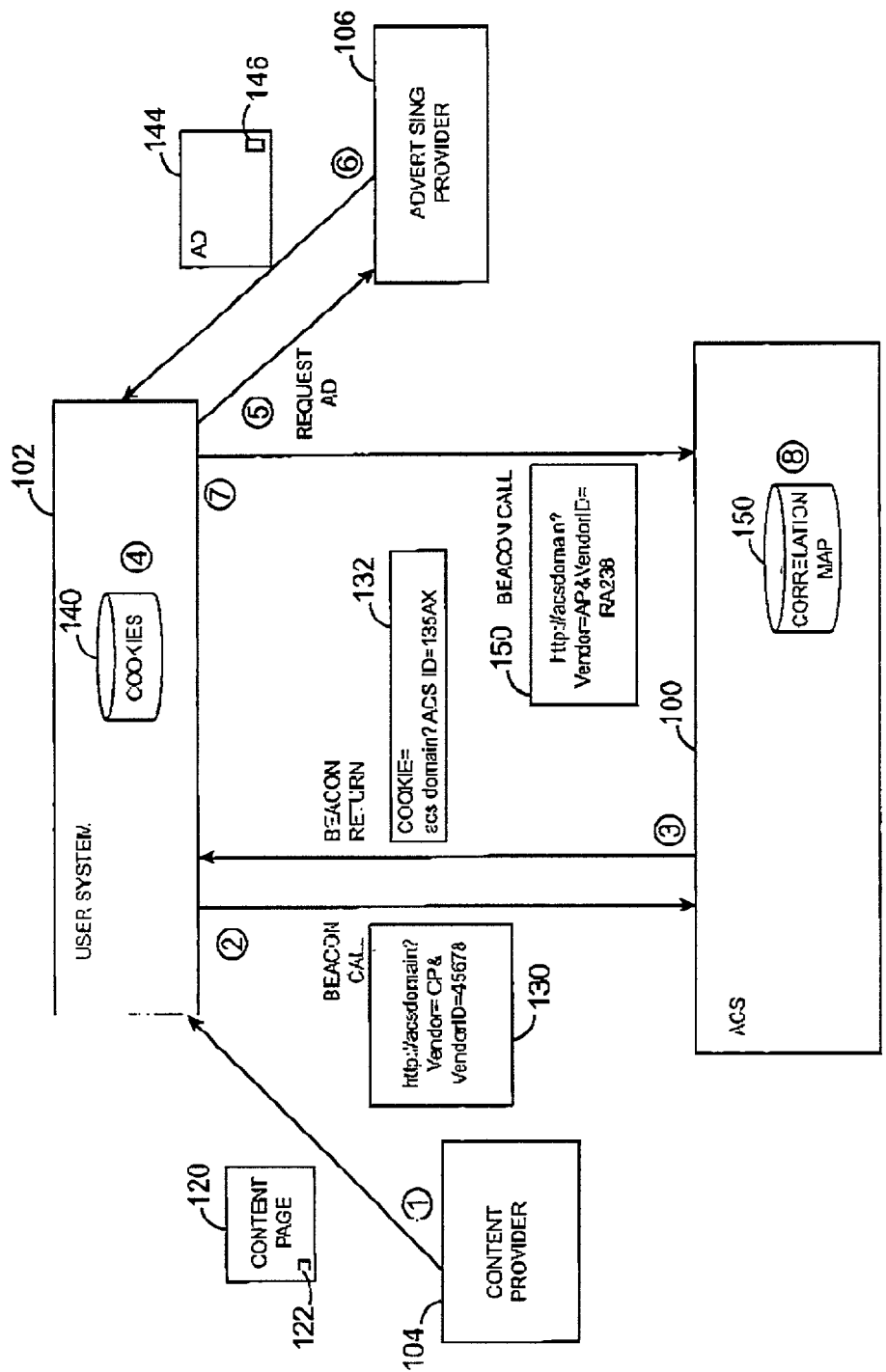
FIG. 5 illustrates a process by which a user is associated with an autonomous correlation system (ACS) identifier without disparate providers having to correlate user data.

In the processes described above, it is assumed that the ACS has a correlation map that allows it to provide temporary IDs to one or more AP and one or more CP such that a reporting system can aggregate data from the AP(s) and CP(s) to form a report. An example process for creating the correlation map will now be described, with reference to FIG. 5. As with FIG. 4, a sequence of steps is illustrated with data flows with numbered labels in circles. Of course, it should be understood that the orders shown in FIGS. 4-5 are not necessarily the only orders that such processes could follow and not all of the steps need to be performed, and additional steps not shown or described might be interspersed.

A correlation process generates an association for a user between user identifiers used in disparate systems. In the process illustrated in FIG. 5, a content provider (CP) user identifier is associated with an advertising provider (AP) user identifier, but the association is done in such a way that neither the CP nor the AP can unilaterally form the same correlation. The correlations can be between one CP and one AP, two CPs, two APs or in the general case, two or more entities that are content providers, advertising providers or entities that publish/gather any information on the Internet. In FIG. 5, the user interaction with the content provider system is assumed to come before the interaction with the advertising provider system, but that need not be the case.

As shown, CP 104 sends a content page 120 (step 1) to user system 102, usually in response to a request for that page from user system 102. Content page 120 is an HTML page that includes an image reference 122 to an image that is one pixel by one pixel. That image reference includes data fields needed for the beacon call, as explained below. While the use of one-by-one images and beacons is one way to convey information, other techniques might work equally well.

Since user system 102 is programmed to retrieve all the images for a page when generating that page (as is standard with a browser), user system 102 makes a request 130 for the one-by-one image using image reference 122 (step 2). Image reference 122 is a reference to a page served by ACS 100, so that request 130 would be sent to ACS 100. Request 130 is not so much a request for the image, but a message passing technique, hence the label "beacon call". As shown, request 130 is in the form of a URL passed as an HTML request message. The URL in the figure references the protocol ("http://"), the ACS's domain ("acsdomain", in this example, but more often will be a fully-qualified domain name), and an additional string ("Vendor=CP&VendorID=45678"). While the URL might also include a path specification, one is not used in this example.

The URL is part of the image reference provided to user system 102 by CP 104. In generating that image reference, CP 104 includes its vendor ID ("CP" in this example) and the user's identifier on the CP system. CP 104 knows the user's identifier because the content provider assigned that identifier. CP 104 knows which user is using user system 102 at this point because the user has already logged in to CP 104 (in a conventional or novel manner) or because user system 102 passes CP 104 identifiers of the system. For example, user system 102 might have already been set up to pass CP cookies to CP 104 with each request directed at CP 104. In any case, CP 104 knows the CP user identifier, so it can include the CP user identifier as part of the image reference URL.

Figure 6:
FIG. 6 is a diagram illustrating a correlation map as might be used by the ACS of FIGS. 4-5 to link user data in an autonomous way.

Assuming that user system 102 has never interacted with ACS 100 before, ACS 100 reads the URL provided by user system 102 and then creates a record in its correlation map 150 for that user. FIG. 6 shows an example of a data structure that might be used as correlation map 150. When a new user system 102 interacts with ACS 100 as described above, ACS 100 creates a record and assigns a new ACS ID ("135AX" in the example), records the associated vendor id ("CP") and the associated vendor user ID ("45678"). ACS 100 then responds to the user system request with a one-pixel image and includes an ACS cookie 132 (step 3). As is well known, when a browser receives a cookie from a server (assuming cookie acceptance is not turned off), the browser stores the cookie and an indication of the server that sent the cookie and sends the cookie back to the server with each subsequent request sent to that server. Thus, user system 102 would store ACS cookie 132 in its cookie storage 140 (step 4). As illustrated, ACS cookie is of the form "cookie=acsdomain&ACSID=135AX". Since ACS 100 maintains an ACS ID for each user, ACS 100 can easily identify the user when the user returns the cookie.

For additional robustness and security, the ACS cookie can be hashed and/or encrypted, so that parties outside the ACS cannot easily derive the users ACS ID, since that might allow other parties to perform a correlation with user identifiable information.

In subsequent beacon calls, user system 102 would include the ACS cookie with the image request. Because that cookie is included, the ACS can identify the user and can then check correlation map 150 for a record associated with the user that sent to cookie and the vendor identified in the request. A record would normally be found (since the record was created along with the cookie being sent out in the first place), so ACS would not normally create another record. However, the ACS will check (or not, if so programmed) the vendor ID and vender user ID provided in the request against the values in the correlation map record for that vendor/user combination. If the vendor user ID in the record does not match the vendor user ID in the request, a new record will be created using the vendor user ID in the request. There are several ways that such a mismatch might occur. For example, if a user with a vendor user ID of 45678 uses a particular machine to establish a correlation map record and then a user with a vendor user ID of 53107 uses that same machine, the request will include the cookie for user 45678, but the request (formed by the CP or AP while user 53107 is using user system 102 to connect to that system) would have a vendor user ID of 53107.

As part of the generation of content page 120 as user system 102, or apart from such generation, user system 102 might request an advertisement from AP 106 (step 5). AP 106 returns an advertisement 144 that includes an image reference 146 (step 6). Image reference 146 references a one-pixel image from the server "acsdomain", so when user system 102 generates a browser view of advertisement 144, user system 102 will make a request to ACS 100 (step 7). This can be accomplished via a redirect and/or iFrame/ iLayer calls. As shown, this results in a beacon call 150 in the form of a URL in an HTTP request directed at "acsdomain" (a domain within the ambit of ACS 102). The URL includes an additional string ("Vendor-AP&VendorID=RA238") that allows ACS 100 to identify the vendor AP and the vendor user ID ("RA238") that vendor AP uses to identify that user. Assuming that user system 102 has already interacted with ACS 100 and accepted a cookie from ACS 100, the user system would also include its ACS cookie with the beacon call, thus allowing ACS 100 to identify the record in correlation map 150 that goes with that user and that vendor. If no record exists for that user/vendor combination (i.e., "AP"/"RA238"), then ACS 100 creates a new record (step 8).

As a result of interactions with various content provider systems and advertising provider systems, the user system will eventually provide ACS 100 with the fields needed to create two or more records for that user in correlation map 150. When user system 102 requests a content page from CP 104 or an ad from AP 106, user system 106 includes a cookie or cookies that are specific to those systems, if user system 102 has such cookies. Because those cookies are provided to CP 104 or AP 106, those systems can determine that user system 102 and the current user, has already been sent image references such as 122 or 146 and need not send the image references each time. The systems might want to sent the image references more that just one time, to cover losses, changing computers, cookie deletion, synchronization issues or the like.

Since the data in the correlation map could be used by one or more of the providers to aggregate data on users including personally identifiable information, it is preferable that ACS 100 be independent of the providers. Since cookies are attached to HTTP page requests based on the server to which the requests are directed, the preferred embodiment has the domain name of the ACS be distinct from the domain names of the providers and not be subdomains of the provider domains, so that provider domain cookies are not attached to HTTP requests directed at the ACS domain.

FIG. 6 illustrates the structure of correlation map 150 with data representing the examples used above. As shown, the user identified with an ACS ID of "135AX" is known to ACS 100, which also knows that that user is known to vendor CP by the vendor user ID "45678" and is known to vendor AP by the vendor user ID "RA238". As illustrated, a column for temporary IDs is created at the start of a session, as explained above. Those temporary IDs are preferably generated such that the ASC ID or vendor user IDs cannot be derived from the temporary IDs with a reasonable amount of computing time and effort. Temporary ID storage is illustrated in FIG. 6 as a separate column, however, it should be understood that actual implementation might vary. For example, some embodiments might use a separate two-column table that correlates temporary IDs in one column with ACS IDs in the other column. This storage, however implemented, allows multiple requests to be initiated against the same rows of data requiring multiple temporary IDs for the same ACS IDs. Other implementations may also be possible.

Users often use more than one user system to interact with providers and this leads to synchronization issues, such as when a user uses two or more user systems (for example, a work machine and a home machine) prior to a link being established. For example, if a user logs into the Yahoo! content provider network at work and, as the user's first interaction with the ACS, is assigned a unique ACS ID "123AA". If the user then goes home and uses a different machine to connect to the Internet and interacts with an ad server, but has not yet interacted with the Yahoo! provider network, the interaction with the ad server and the ACS will result in that user being assigned another, different ASC ID, say "124AA".

When the user again returns to the work machine, the ad provider may identify that user as the same user as before, assuming that the ad provider is able to identify the user and not just the user's browser. Most third-party ad providers lack this ability, but in some cases the ad provider is also a content provider, so they are likely to have registered users logged into their systems (Yahoo! operates an example of such a system). Hence, while serving ads, they can identify that the same user is now on a different machine. There may be other conditions under which a third-party ad provider may be able to identify the user separate from its machine.

At this point, assume the ad server has an entry in the ACS for that user of 124AA, while the cookie set on that machine is based on the prior login and has an associated ASC ID of 123AA. To resolve and synchronize the ASC IDs, whichever cookie is set on the given machine overwrites the ASC ID field in the correlation map. In this example, the ad server beacon identifying the user would receive a new ASC ID value of 123AA. The ASC will also sweep its correlation map and replace any 124AA entries with 123AA and the ACS user ID of 124AA is then considered null and is ignored.

Figure 7:
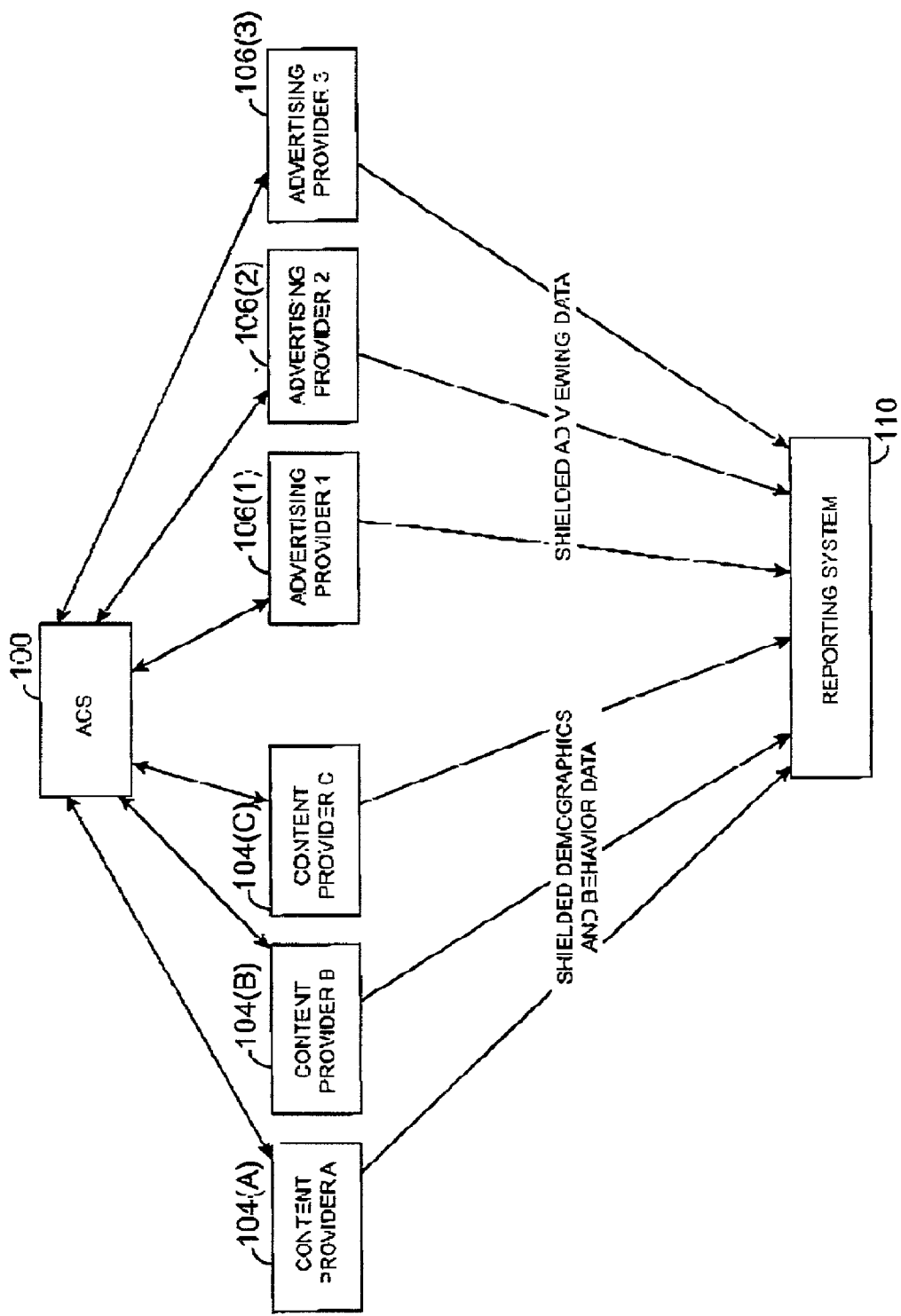
FIG. 7 is a diagram illustrating how a reporting engine might obtain information from a plurality of sources and aggregate that data without needing to compromise user privacy or needing to allow parties to share user data to obtain more information than the parties already had.

In the above-described figures, one content provider is shown and one advertisement provider is shown. FIG. 7 illustrates the more general case, with ACS 100 interacting with a plurality of content providers 104(*a*)-(*c*) and a plurality of advertising providers 106(1)-(3), where shielded information is provided to reporting system 110 from each provider. It should be understood that a distinction between content providers and advertisement providers is not required, as a provider might provide content and advertisement, or provide other than content and advertisement, or provide content that serves as advertisement. It should also be understood that the content providers and advertising providers could be replaced with other entities that publish or interact with users on the Internet. With multiple data providers, each provider can market and sell their data without compromising user privacy, where each publisher can potentially provide its data to the agency at a cost that depends on the value they add to the reports.

Systems and methods for aggregating data from distinct sources while keeping any potential mapping of users from the data sources limited to the scope defined within a report specification have now been described. Other variations from what has been described can also be designed, without departing from the scope of the invention, which is defined by the appended claims. Subsequent to report generation, the advertising system, the content provider (such as Yahoo!), the reporting engine, and the agency cannot easily correlate any specific user from one data source to another. This then allows for the extraction of more detailed information from either data server without comprising user privacy.

Aside from the uses of an autonomous correlation system described above, such a system might also be used for other effects, such as cross-site per-session logins and a universal opt-out system.

Cross-site per-session logins can be easily implemented with an ACS, because once a user has logged into a first ACS-enabled site, a second site may query the ASC ID for login information for visitors to that second site and can authenticate the user using the second sites own existing systems, without having to ask the user for login and password information. This can provide for seamless login into multiple sites without requiring the user to perform multiple logins.

A universal opt-out system is made possible because, with a single request, the user would be able to opt-out of data gathering and sharing for any vendor who can identify that user from their ASC ID.

The invention has now been described with reference to the preferred embodiments. Alternatives and substitutions will now be apparent to persons of skill in the art. Accordingly, it is not intended to limit the invention except as provided by the appended claims.

What is claimed is:

1. A method for correlating user data from a content provider and advertising view data from an advertising provider, wherein the user data of the content provider is present on a first autonomous system and the advertising view data of the advertising provider is present on a second autonomous system distinct from the first autonomous system, the first and second autonomous systems being autonomous in that each is normally secured against unconstrained access by another, the method comprising:
   receiving a first message from a user at an autonomous correlation system that is autonomous from the content provider and the advertising provider, the first message comprising an indication of a first object being presented to the user and a first user identifier associated with the user, the first object comprising content from the content provider;
   storing an association between the first user identifier and the user;
   receiving a second message from the user at the autonomous correlation system, the second message comprising an indication of a second object being presented to the user and a second user identifier associated with the user, the second object comprising an advertisement from the advertising provider;
   storing an association between the second user identifier and the user, wherein the first and second identifier are different; and
   generating a report based on the stored associations between the first and second user identifiers and the user, the report indicating that the content from the content provider from the first object and the advertisement from the advertising provider from the second object were presented to the user.

2. A computer-readable storage medium comprising instructions for correlating user data from a content provider and advertising view data from an advertising provider, wherein the user data of the content provider is present on a first autonomous system and the advertising view data of the advertising provider is present on a second autonomous system distinct from the first autonomous system, the first and second autonomous systems being autonomous in that each is normally secured against unconstrained access by another, the set of instructions to direct a computer system to perform acts of:
   receiving a first message from a user at an autonomous correlation system that is autonomous from the content provider and the advertising provider, the first message comprising an indication of a first object being presented to the user and a first user identifier associated with the user, the first object comprising content from the content provider;
   storing an association between the first user identifier and the user;
   receiving a second message from the user at the autonomous correlation system, the second message comprising an indication of a second object being presented to the user and a second user identifier associated with the user, the second object comprising an advertisement from the advertising provider;
   storing an association between the second user identifier and the user, wherein the first and second identifier are different; and
   generating a report based on the stored associations between the first and second user identifiers and the user, the report indicating that the content from the content provider from the first object and the advertisement from the advertising provider from the second object were presented to the user.

* * * * *